(12) United States Patent
Cargile

(10) Patent No.: US 6,405,887 B1
(45) Date of Patent: Jun. 18, 2002

(54) BLOW-MOLDED CONTAINER HAVING REINFORCEMENT RIBS AND METHOD AND APPARATUS FOR MAKING SAME

(75) Inventor: David W. Cargile, Lititz, PA (US)

(73) Assignee: Graham Packaging Company, L.P., York, PA (US)

( * ) Notice: Subject to any disclaimer, the term of this patent is extended or adjusted under 35 U.S.C. 154(b) by 0 days.

(21) Appl. No.: 09/622,322
(22) PCT Filed: Dec. 15, 1999
(86) PCT No.: PCT/US99/29847
§ 371 (c)(1), (2), (4) Date: Aug. 15, 2000
(87) PCT Pub. No.: WO00/35759
PCT Pub. Date: Jun. 22, 2000

Related U.S. Application Data
(60) Provisional application No. 60/112,462, filed on Dec. 16, 1998.

(51) Int. Cl.[7] .............................................. B65D 92/02
(52) U.S. Cl. ...................................... 215/379; 210/660
(58) Field of Search ................................ 215/379, 382, 215/42, 381; 220/660, 669, 675, 623, 671; 264/541, 177.5, 209.1, 209.3, 209.4; 425/532, 380, 381, 467

(56) References Cited

U.S. PATENT DOCUMENTS

| 3,114,932 A | 12/1963 | Donnelly | |
| 3,956,441 A | 5/1976 | Uhlig | 264/89 |
| 4,005,245 A | 1/1977 | Edwards | 428/542 |
| 4,170,622 A | 10/1979 | Uhlig | 264/520 |
| 4,496,301 A | 1/1985 | Mozer et al. | 425/532 |
| 4,620,639 A | 11/1986 | Yoshino | 215/1 C |
| 4,649,068 A | * 3/1987 | Collette | 428/35 |
| 4,781,880 A | 11/1988 | Robbins, III | 264/541 |
| 4,869,862 A | 9/1989 | Bryan | 264/541 |
| 4,885,197 A | 12/1989 | Strassheimer | 428/36.92 |
| 4,890,757 A | 1/1990 | Robbins, III | 220/72 |
| 5,048,977 A | 9/1991 | Robbins, III | 383/104 |
| 5,057,267 A | 10/1991 | Seizert et al. | 264/541 |
| 5,198,161 A | 3/1993 | Ogura et al. | 264/40.5 |
| 5,261,558 A | 11/1993 | Claydon | 220/671 |
| 5,330,342 A | 7/1994 | Linss et al. | 425/150 |
| 5,486,333 A | 1/1996 | Mavridis et al. | 264/541 |
| 5,620,722 A | 4/1997 | Spina | 425/532 |
| D404,868 S | 1/1999 | Conn | D34/11 |
| D405,575 S | * 2/1999 | Conn | D34/1 |
| 5,865,338 A | 2/1999 | Conn | 220/675 |

FOREIGN PATENT DOCUMENTS

| EP | 296 468 | 12/1988 | |
| EP | 573683 | * 12/1993 | 215/379 |
| WO | WO 98/42580 | 10/1998 | |

* cited by examiner

Primary Examiner—Lee Young
Assistant Examiner—Lien Ngo
(74) Attorney, Agent, or Firm—Howson and Howson

(57) ABSTRACT

A blow-molded plastic container (10) providing enhanced top loading capability. The container (10) has an inner peripheral surface (24) on which a plurality of integral, solid, inwardly and longitudinally extending ribs (26) are formed. Preferably, the ribs (26) extend throughout the entire container inner surface (24) from the top edge of the finish (20) to a mold parting line (28) on the base (14). A method and apparatus for making the container (10) is also disclosed.

13 Claims, 4 Drawing Sheets

BLOW-MOLDED CONTAINER HAVING REINFORCEMENT RIBS AND METHOD AND APPARATUS FOR MAKING SAME

This application claims priority from provisional application Ser. No. 60/112,462, filed Dec. 16, 1998.

FIELD OF THE INVENTION

The present invention relates to a sturdy blow-molded container made from a minimum of plastic, and more particularly, the present invention relates to a container having integrally formed inwardly extending ribs which enhance container stability and improve container top loading capabilities. The present invention also relates to a method and an apparatus for making a reinforced blow-molded container.

BACKGROUND OF THE INVENTION

Various household, automotive and other products, such as liquid, granular or gel products, including shampoo, detergents, motor oil, etc., are commonly packaged and sold to consumers in relatively small-sized, plastic, blow-molded containers, or bottles. For example, in excess of two billion one quart/one liter sized blow molded containers for packaging motor oil are sold annually in the United States alone. Because of the volume of the sales, improvements to the packaging of such products is of significant concern to the packaging industry and to consumers, especially those improvements which relate to the cost of the packaging and its structural capabilities relative to existing packaging.

Plastic blow-molded containers can be manufactured in a variety of shapes and sizes from a variety of plastic materials in any number of known blow molding processes. For instance, many containers are made from high density polyethylene (HDPE) in an extrusion blow-molding process. The containers are required to have sufficient rigidity so that they are able to withstand the rigors of filling, stacking, shipping, handling and eventual use by the consumer.

A significant expense incurred in the manufacture of blow molded containers is the plastic required to make the containers. For instance, a typical one quart blow-molded oil container which meets stability requirements may be manufactured from about 51 grams of HDPE. Significant savings can be achieved by reducing the amount of plastic required to make each container. As an example, assume that HDPE is sold at 40 cents/pound (0.09 cents/gram), that a reduction of three grams of plastic per container can be achieved, and that 100 million containers are to be produced for a given year. The reduction of three grams of HDPE per container results in a savings of $27 million for the year.

The degree of container rigidity required for packing and shipping purposes limits the ability of manufacturers to reduce the amount of plastic consumed in the manufacture of containers. This is because filled containers are packed in bulk in cardboard boxes, or plastic wrap, or both and placed on shipping pallets. A bottom row of packed, filled containers may support several upper tiers of filled containers, and potentially, several upper boxes of filled containers. A commercially-satisfactory container must be sufficiently rigid to resist distortion under these top loading conditions.

The rigidity of containers is measured by vertical compression tests and is referred to as top loading capability. For instance, a one quart oil container may require a top loading capability of about 45 to 50 pounds. A reduction in the amount of grams of plastic in the container can result in a decrease in top loading capability, unless design changes are made to offset the inherent loss of strength due to a reduction in the amount of plastic. Thus, for every container configuration, a balance must be achieved between minimizing the amount of plastic for cost saving purposes and providing a sufficient amount of plastic to provide container rigidity.

Ribs have been utilized in containers for reinforcement purposes. For instance, U.S. Pat. Nos. 5,048,977; 4,781,880; and 4,890,757 which all issued to Robbins III, disclose extrusion blow molding containers with alternating ribs and non-self-supporting webs so that the containers are collapsible in a storage condition and self-supporting in an open position. Also, U.S. Pat. Nos. 3,956,441 and 4,170,622 which issued to Uhlig disclose blow-molded containers having interior ribbed surfaces. U.S. Pat. No. 3,114,932 issued to Donnelly; U.S. Pat. No. 4,496,301 issued to Mozer et al.; U.S. Pat. No. 4,869,862 issued to Bryan; U.S. Pat. No. 5,057,267 issued to Seizert et al.; U.S. Pat. No. 5,198,161 issued to Ogura et al.; U.S. Pat. No. 5,330,342 issued to Linss et al.; U.S. Pat. No. 5,486,333 issued to Mavridis et al.; and U.S. Pat. No. 5,620,722 issued to Spina disclose various methods and apparatus for extruding substantially tubular parisons which have walls with non-uniform thicknesses and which are intended for blow molding.

Although the above referenced ribbed containers may function satisfactorily for their intended purposes, there is a need for a novel blow-molded plastic container which has an exterior configuration similar, or identical, to that which consumers have favored, but which is capable of being manufactured from a reduced amount of plastic while having the same or increased top loading capability. Preferably, the container should be produced according to a novel extrusion blow molding process by apparatus having an extrusion head with a unique configuration that forms longitudinal integral reinforcing ribs on the interior of the container.

OBJECTS OF THE INVENTION

With the foregoing in mind, a primary object of the present invention is to provide a blow-molded plastic container which has an exterior surface configuration substantially identical to currently favored containers but which has a reinforced inner surface providing a desirable top loading capability.

Another object of the present invention is to provide a container which provides a sufficient amount of top loading capability while affording a reduction in the amount of plastic used to manufacture the container as compared with known like-sized plastic containers.

A further object of the present invention is to provide a novel method of manufacturing a container having an inner surface with integral longitudinal reinforcement ribs.

A still further object of the present invention is to provide apparatus which is capable of extruding a longitudinally, internally, ribbed parison and which has a uniquely configured extrusion head.

SUMMARY OF THE INVENTION

More specifically, the present invention provides a plastic blow molded container having an inner surface with integrally-formed, longitudinally-extending, inwardly-projecting ribs. At least some of the ribs extend continuously from the container finish, vertically along the container sidewall, and into the container base. Preferably, at least some of the ribs extend continuously throughout the entire distance of the container from the top edge of the finish to a central mold parting location on the base. The ribs, which are not visually perceptible when viewing the exterior surface of the filled container, permit the container to be made from a reduced amount of plastic while providing the required amount, or better, of top loading capability.

According to another aspect of the present invention, a novel method of manufacturing a container is disclosed. In it, a substantially tubular parison having an inner peripheral wall with a plurality of spaced-apart, inwardly-projecting, solid ribs is extruded and then positioned within a blow mold. The parison is expanded under pressure into the walls of the blow mold thereby forming a container. The ribs of the parison become ribs on the inner surface of the container and provide a longitudinal reinforcement function, primarily in the sidewalls of the container.

According to yet another aspect of the present invention, apparatus for making the reinforced containers is disclosed. The apparatus utilizes a unique star-shaped mandrel which cooperates with a tubular orifice to permit a substantially tubular parison to be extruded with continuous, longitudinally-extending ribs on an inner peripheral surface of the parison.

BRIEF DESCRIPTION OF THE DRAWINGS

The foregoing and other objects, features and advantages of the present invention should become apparent from the following description when taken in conjunction with the accompanying drawings, in which.

DETAILED DESCRIPTION OF THE PREFERRED EMBODIMENT

Figure 1:
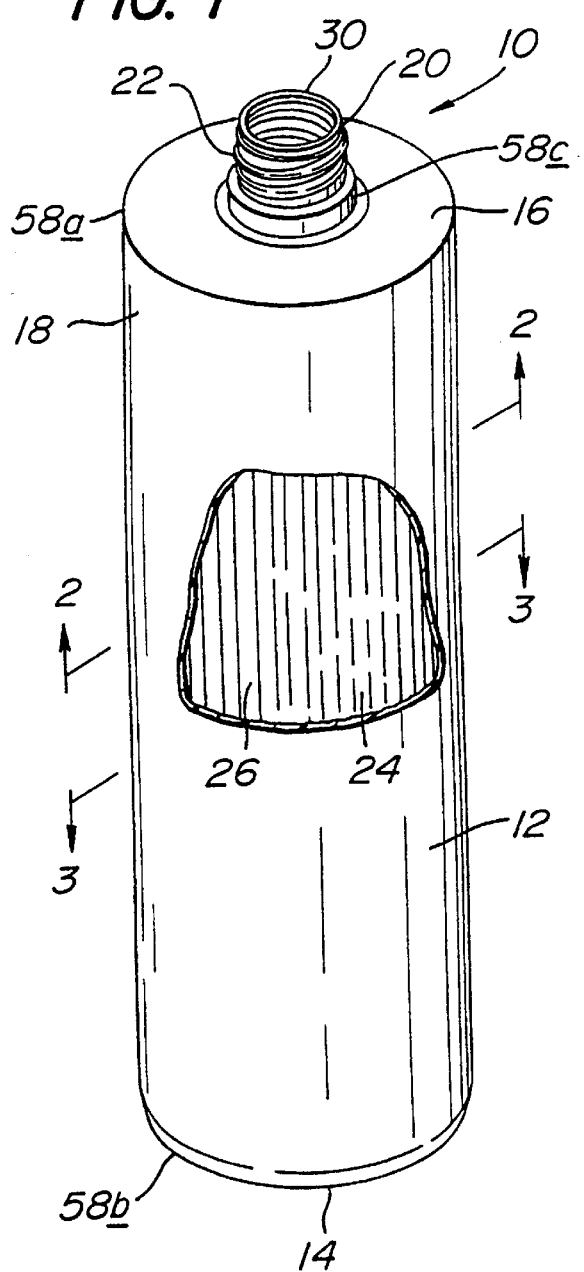
FIG. 1 is a partially cut-away perspective view of a container embodying the present invention.

FIG. 1 illustrates a blow-molded plastic container, or bottle, 10 having a typical configuration for packaging a fluent product, such as in this instance, shampoo. Generally, such a container 10 is produced by an extrusion blow molding process in high speed, automated machinery. Such a bottle 10 is typically made of a sufficient amount of plastic, such as high density polyethylene (HDPE), so that the container provides a predetermined minimum level of top load capability.

As illustrated in FIG. 1, the bottle 10 has a cylindrical sidewall 12 extending between a base 14 and a shoulder 16.

The sidewall 12 has a generally smooth exterior surface 18 on which labels (not shown) are glued or printed. The shoulder 16 has a finish 20 with threads 22 for cooperatively engaging a threaded cap (not shown). Typically, the sidewalls of such a container have a substantially uniform thickness and an inner surface which is smooth like the exterior surface.

Figure 2:
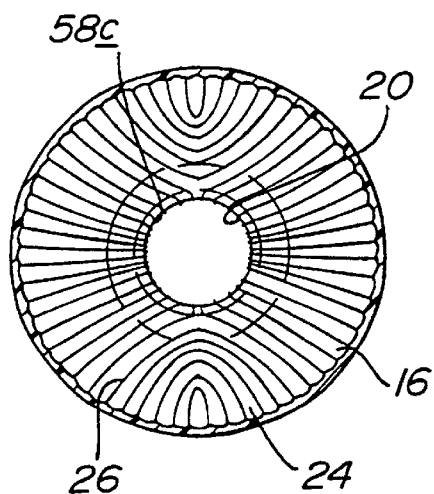
FIG. 2 is a cross sectional view of the container of FIG. 1 taken along line 2—2 and looking in a direction toward the container finish.
Figure 3:
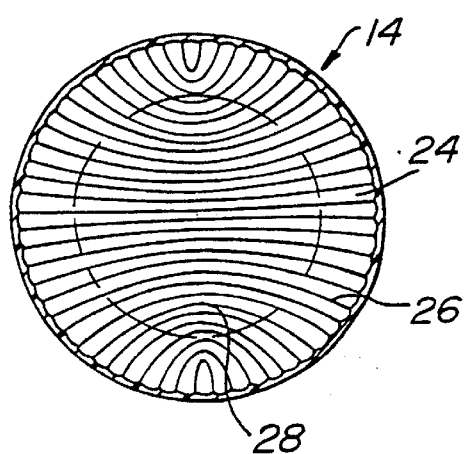
FIG. 3 is a cross-sectional view of the container of FIG. 1 taken along line 3—3 and looking in a direction toward the container base.

In contrast, the container 10 according to the present invention has an inner surface 24 with a plurality of inwardly and longitudinally extending, solid ribs 26 which stiffen and reinforce the container 10 longitudinally. As illustrated in the cut-away portion of FIG. 1, the ribs 26 are spaced-apart and extend continuously in a vertical direction throughout the sidewall 12. Preferably, as illustrated in FIGS. 2 and 3, the ribs 26 also extend continuously onto the base 14 to a central mold parting line 28, and onto the shoulder 16 through to a top edge 30 of the finish 20. Thus, the ribs 26 extend throughout the entire extent of the inner surface 24 of the container 10.

Since the ribs are continuous, the ribs extend through the various bends or corners formed in the blow molded container to reinforce the container at these locations and prevent deformation at such junctures. For example, the container 10 has a corner 58a at the juncture of the sidewall 12 and shoulder 16; a corner 58b at the juncture of the sidewall 12 and base 14; and a corner 58c at the juncture of the shoulder 16 and finish 20. The ribs 26 extend on the inner surface 24 across the junctures, or corners, 58a, 58b and 58c to reinforce and stiffen the container 10 at these locations which otherwise would buckle at unacceptable levels of top loading. Other container configurations may have several other such junctures, such as, at label bumpers.

The number, size and spacing of the ribs 26 can vary depending on the desired level of reinforcement desired. By way of example, and not by way of limitation, the sidewall 12 of the container 10 illustrated in FIG. 1 has an outer diameter of about 2 3/16 inches and an inner surface with 60, equally spaced and sized, longitudinally-extending ribs 26. Each rib 26 extends inwardly approximately 0.002 to 0.015 inches from the inner surface 24 of the sidewall 12 and is about 0.010 to 0.125 inches wide. Each rib 26 has a curved bead-like shape in transverse cross section, but could have other cross-sectional shapes, such as, triangular. The container 10 is designed so that it has a capacity of about 2 to 64 ounces, is made from about 6 to 100 grams of HDPE, and has an improved top loading capability up to 20% relative to a similarly constructed ribless container.

When a container 10 is made from HDPE, or like plastic, the ribs 26 are not visually perceptible when viewing the exterior surface 18 of the filled container 10. In addition, most known container configurations which are produced by blow molding techniques can be blow molded with the ribs 26. Thus, container configurations which are already known and favored by consumers and which provide brand recognition, can be blow molded in the same molds to produce identical appearing containers which differ only in that ribs are blown integral on the inner walls of the container to structurally reinforce and stiffen the container. If a given container is made from an equal amount of plastic, the ribbed version of the container made according to the present invention will provide enhanced structural performance, such as greater top loading capability. Alternatively, if the ribbed version of the container is to provide similar structural performance as the prior art non-ribbed version, the ribbed container can be manufactured from a reduced amount of plastic, and thus provide a cost savings. Such savings become significant when large quantities of a specific container design are manufactured. In addition, such a container provides less plastic which needs to be recycled and weighs less thereby reducing shipping costs.

As previously mentioned, one contemplated type of container on which the ribs can be utilized to provide significant cost savings is the typical one quart/one liter motor oil container. Such containers generally have a substantially rectangular configuration and are well known in the art. For comparative test purposes, such a container was manufactured with the reinforcement ribs according to the present invention. The number, shape, and size of the ribs were similar to that of container 10 illustrated in FIG. 1. One of the containers tested was made of 47.8 grams of HDPE and provided 89 pounds of top loading capability, and another tested container was made of 46.6 grams of HDPE and provided 76 pounds of top loading capability. Both of the tested containers, provided a greater top loading capability then an identical appearing, prior art, ribless container which was made from more grams of plastic. Therefore, although all three containers visually appeared to be identical, the containers manufactured according to the present invention provided a cost savings and were structurally superior.

While only certain container structures are illustrated or discussed herein, the present invention can be used to produce a wide variety of blow molded container configurations. Preferably, a container made in accordance with the present invention will have about 30 to 180 number of ribs which extend inwardly within a range of about 0.002 to 0.015 inches and which have a width of 0.010 to 0.125 inches.

The number and size of the ribs typically depends on the size of the container body; for instance, a bottle having a 100 ml capacity may have 39 relatively shallow ribs, whereas a bottle having a 3 liter capacity may have up to 180 relatively deeply extending ribs. Preferably, the ribs are spaced 0.020 to 0.250 inches apart and are continuous from the mold parting line on the top of the container to the mold parting line on the base of the container. In addition, while the ribs are located throughout the entire inner surface of the container including the base and finish, they need only extend in the sidewall.

DETAILED DESCRIPTION OF THE PREFERRED METHOD

Figure 4:
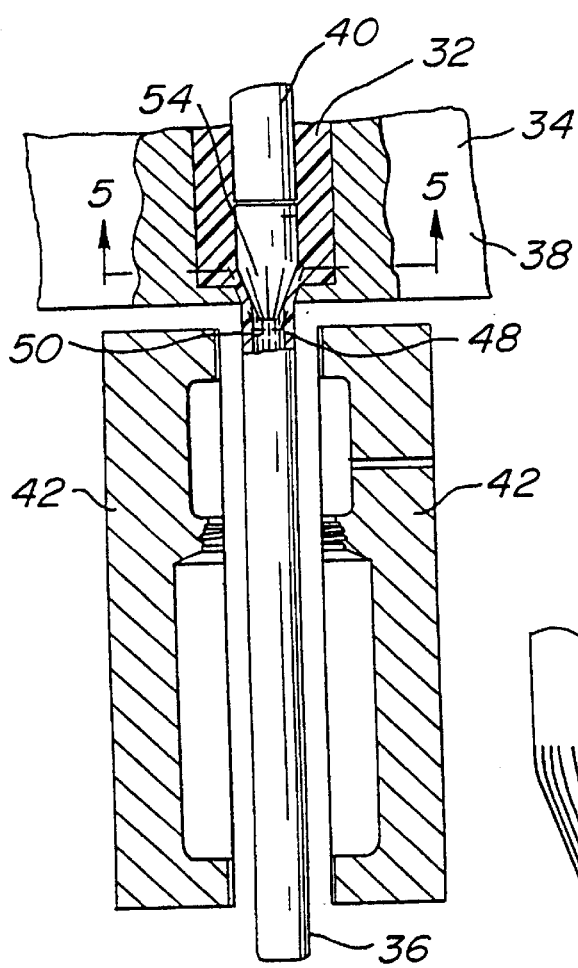
FIG. 4 is a partially cut-away cross-sectional view of a parison extruded from an extrusion head and located between an open pair of blow-mold halves.
Figure 8:
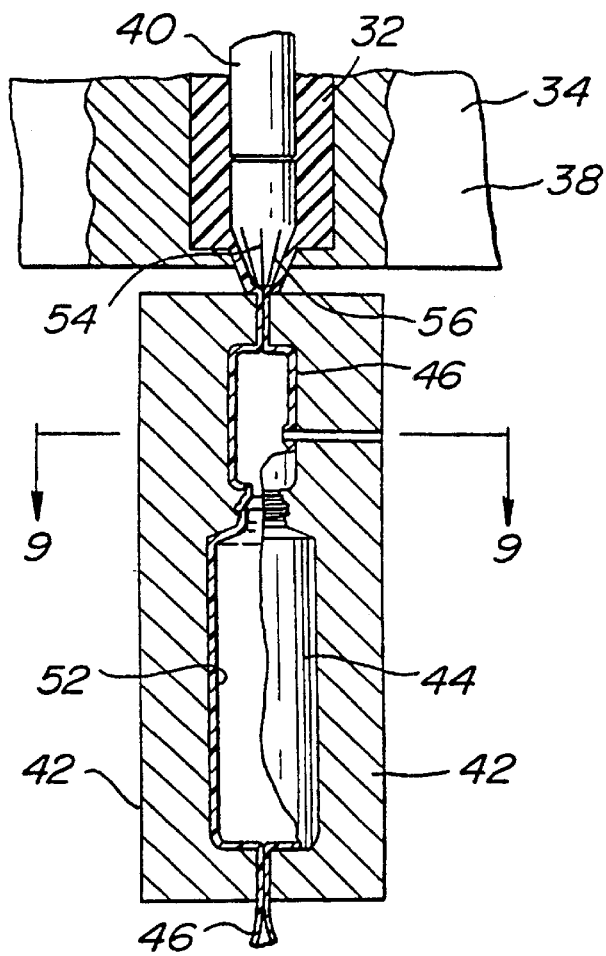
FIG. 8 is a partial cross-sectional view of a closed blow-mold having an inner cavity against which a parison has been blown to form a container.
Figure 9:
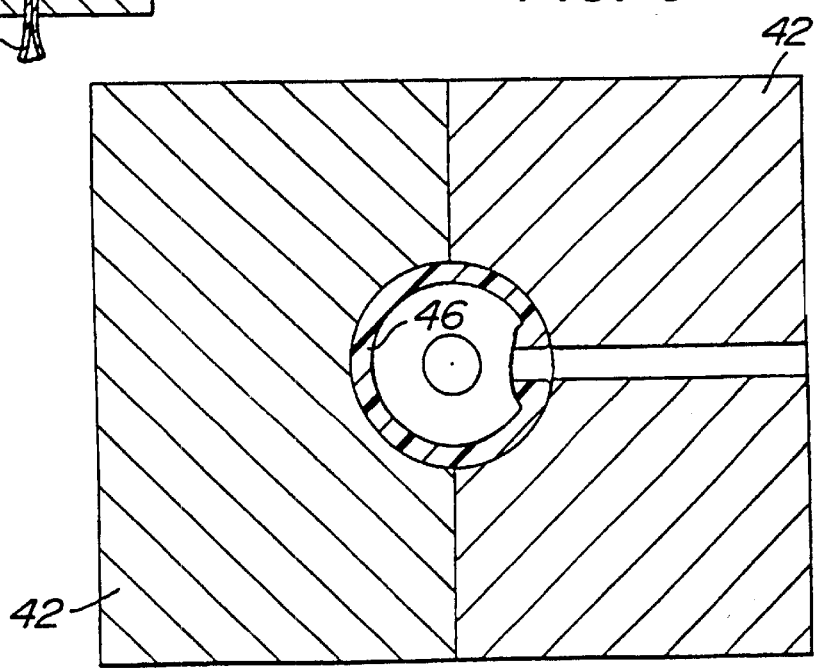
FIG. 9 is a cross-sectional view of the blow-mold and blown parison taken along line 9—9 of FIG. 8.

The container 10, discussed above, is produced by a novel method which is best illustrated in FIGS. 4 and 8. Molten plastic 32 is extruded through an extrusion head 34 to form a downwardly depending tubular parison 36. The extrusion head includes a die 38 and a mandrel 40.

As illustrated in FIG. 4, a pair of mold blocks 42 are positioned in an open condition adjacent the downwardly extending parison 36. When the parison is extruded a sufficient distance, the mold blocks 42 close around the parison 36 as illustrated in FIG. 8. A blow pin (not shown) is inserted into the mold 42 and the parison 36 to inflate the parison 36 into a container 44. After the container 44 is removed from the mold 42, the plastic moil 46 is removed and recycled.

A unique aspect of the method of the present invention is that the parison 36 is extruded with an inner peripherals wall 48 that has a number of continuous, longitudinally and inwardly extending ribs 50. Thus, the resulting container 44 is formed with ribs extending inwardly from the inner surface 52 of the container 44, preferably, continuously throughout the full length of the parison 36 and the container 44. The ribs 50 reinforce and stiffen the container 44 axially to provide it with enhanced top loading capability. The number, shape, size and spacing of the ribs 50 can vary such as discussed previously.

DETAILED DESCRIPTION OF THE PREFERRED APPARATUS

Figure 6:
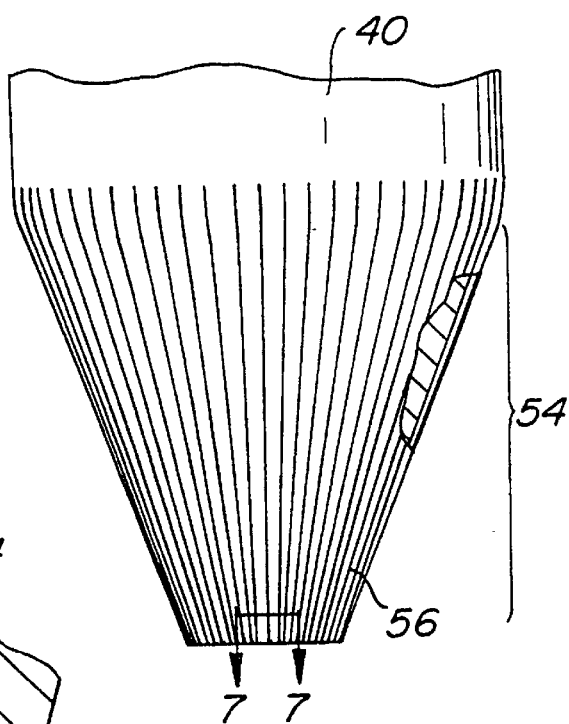
FIG. 6 is an elevational view of a mandrel used to extrude a ribbed parison according to the present invention.
Figure 7:
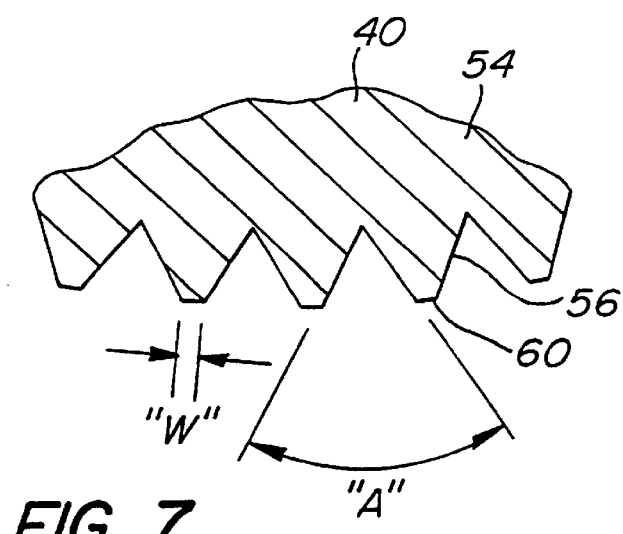
FIG. 7 is a cross-sectional view of a peripheral portion of the mandrel of FIG. 6 taken along line 7—7.
Figure 5:
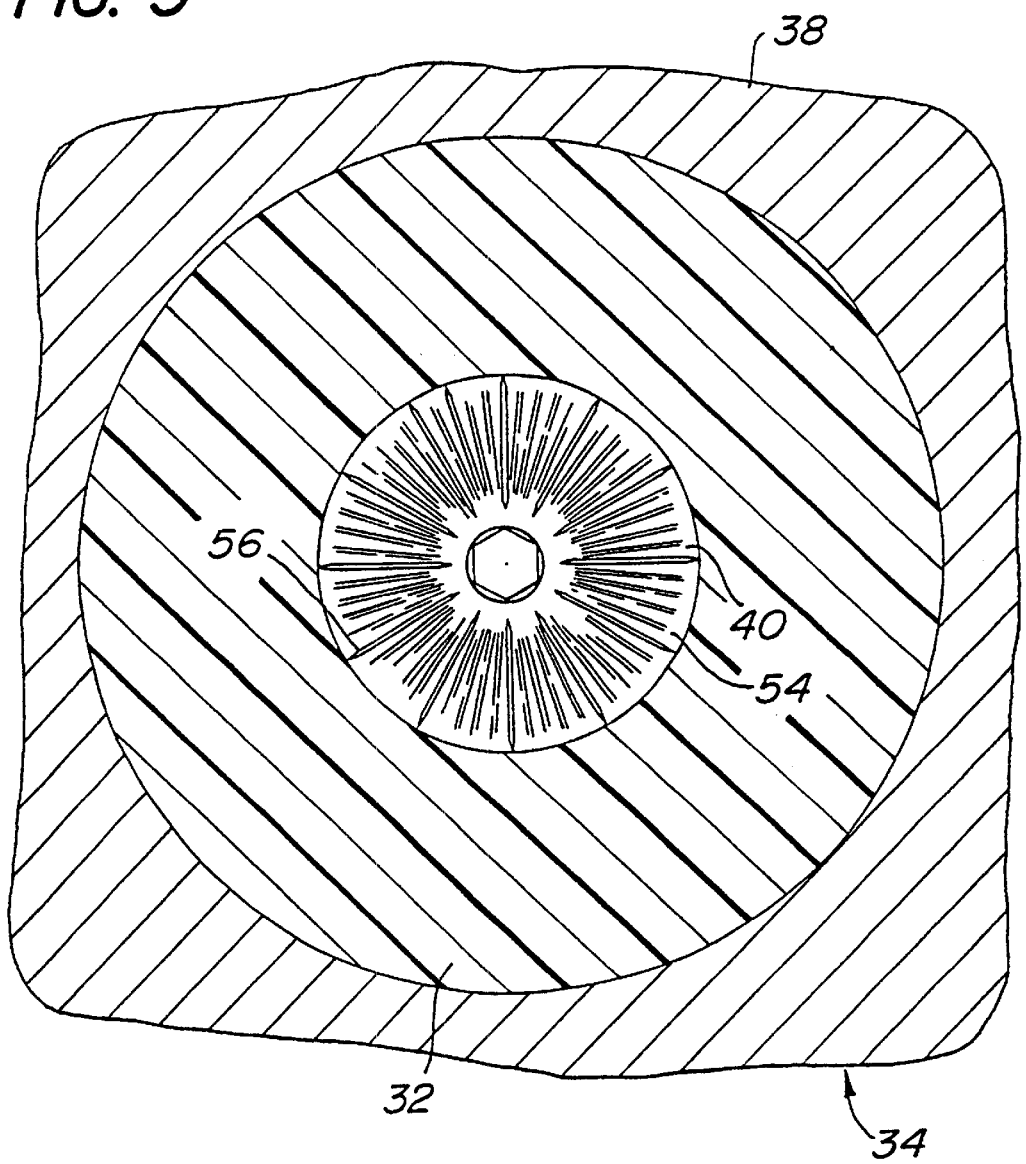
FIG. 5 is a cross-sectional view of an extrusion head taken along line 5—5 of FIG. 4.

The extrusion head 34 utilized to extrude a ribbed parison 36 includes a mandrel 40 cooperatively positioned a spaced distance from and within a die 38. The mandrel has a frustoconical tip 54 with a plurality of longitudinally extending grooves 56 as illustrated in FIGS. 5–7. The relative spacing of the mandrel 40 relative to the die 38 determines the thickness of the extruded parison; while, the number, depth and spacing of the grooves 56 determine the number, size and spacing of the ribs formed on the inner peripheral wall of the parison.

The plurality of grooves 56 provide the tip of the mandrel with a "star-shaped" configuration and provide the tubular parison with continuous, inwardly and longitudinally extending ribs throughout the length of the parison. Preferably, the mandrel has about 30 to 180 grooves each having a depth of about 0.015 to 0.030 inches. As best illustrated in FIG. 7, each groove 56 can be V-shaped in transverse cross section with the legs of the V-shape formed at an angle "A" of about 45 to 75°. A peripheral arcuate land 60 is formed between each V-shaped groove 56 and has a width "W" of about 0.002 to 0.010 inches. The mandrels are designed to be readily interchangeable so that the extrusion head can be easily adjusted to extrude any number of ribs depending on the mandrel installed.

The described container, method of making the container, and apparatus for making the container provide a sturdy package for fluent products at a reduced cost. The container provides the required amount of top loading capability yet is made from less plastic. The invention can be applied to existing container designs so that an already favored container can be improved by making it sturdier or with less plastic. The containers can be efficiently and inexpensively blow-molded, without requiring expensive changes to already existing blow molds, from any of several commercially-available plastics, such as HDPE, and provide an aesthetic appearance despite the rigors of filling, handling and top loading.

While a preferred container, method of making the container, and apparatus for making the container has been described in detail, various modifications, alterations, and changes may be made without departing from the spirit and scope of the present invention as defined in the appended claims.

What is claimed is:

1. A container, comprising:
   a plastic extrusion blow-molded bottle-shaped container body (10) having an inner surface (24), a base (14) having a mold parting line (28), a sidewall (12) extending upwardly from said base (14), a shoulder (16) extending inwardly and upwardly from said sidewall (12), and a blow molded upstanding finish (20) extending from said shoulder (16) defining a dispensing opening in said container body (10); and
   a plurality of inwardly-extending, solid ribs (26) integrally formed on said inner surface (24) of said container body (10), each rib (26) extending continuously from a top edge of said finish (20) to said mold parting line (28) on said base (14) such that each rib (26) extends longitudinally on said sidewall (12).

2. The container (10) according to claim 1, wherein said inner surface (24) has regions with juncture-forming structures (58a, 58b, 58c) and wherein said ribs (26) extend continuously through said juncture-forming structures (58a, 58b, 58c).

3. A container (10) according to claim 2, wherein a corner-like structure (58a) provides one of said juncture-forming structures between the sidewall (12) and the shoulder (16).

4. The container (10) according to claim 2, wherein a corner-like structure (58c) provides one of said juncture-forming structures between the finish (20) and the shoulder (16).

5. The container (10) according to claim 4, wherein a corner-like structure (58b) provides one of said juncture-forming structures between the sidewall (12) and the base (14).

6. The container (10) according to claim 2, wherein said ribs (26) are equally spaced apart in at least said sidewall and total at least 30 in number.

7. The container (10) according to claim 6, wherein each of said ribs (26) extends inwardly from said inner surface (24) in a range from about 0.002 to 0.015 inches.

8. The container (10) according to claim 7, wherein each of said ribs (26) has a width of about 0.010 to about 0.125 inches.

9. A method of blow molding a plastic container (10), comprising the steps of:

extruding a parison (36) of molten plastic having an inner peripheral tubular surface with integrally formed, solid, inwardly and longitudinally-extending, internal ribs (50);

disposing said extruded parison (36) between open mold blocks (42);

closing said mold blocks (42) about said internally ribbed parison (36); and blowing said parison (36) in said closed mold blocks (42) to form a container (10) having a base (14) with a mold parting line (28) where the parison is pinched closed, a sidewall (12) extending upwardly from said base (14), a shoulder (16) extending inwardly and upwardly from said sidewall (12), a blow molded upstanding finish (20) extending from said shoulder (16) defining a dispensing opening in said container (10), and reinforcement ribs (26) located on an inner surface (24) of said container (10) and extending continuously from a top edge of said finish (20) to said mold parting line (28) on said base (14) such that each rib (26) extends longitudinally on said sidewall (12).

10. The method according to claim 9, wherein said ribs (50) extend continuously throughout the length of the parison (36).

11. The method according to claim 10, wherein said parison (36) has about 30 to about 180 ribs (50).

12. A plastic bottle prepared by a process comprising the steps of:

extruding a parison of molten plastic having an inner peripheral tubular surface with integrally formed, solid, inwardly and longitudinally extending internal ribs;

disposing said extruded parison between open mold blocks;

closing said mold blocks about said parison; and inflating said parison in said closed mold blocks to form a container body having an inner surface, a base having a mold parting line where the parison is pinched close, a sidewall extending upwardly from said base, a shoulder extending inwardly and upwardly from said sidewall, a blow molded upstanding finish extending from said shoulder defining a dispensing opening in said container body, and a plurality of inwardly-extending, solid ribs integrally formed on said inner surface of said container body, each rib extending continuously from a top edge of said finish to said mold parting line on said base such that each rib extends longitudinally on said sidewall.

13. A plastic bottle prepared by a process according to claim 12, wherein said parison is extruded with at least 30 internal ribs which are equally and uniformly spaced-apart on said inner peripheral tubular surface of said parison.

* * * * *